(12) United States Patent
Kim et al.

(10) Patent No.: US 12,288,906 B2
(45) Date of Patent: Apr. 29, 2025

(54) SYSTEM AND METHOD FOR DETERMINING PERFORMANCE OF FUEL CELL STACK

(71) Applicants: HYUNDAI MOTOR COMPANY, Seoul (KR); Kia Corporation, Seoul (KR)

(72) Inventors: Doo Hyun Kim, Yongin-si (KR); Hyo Jin Park, Hwaseong-si (KR); Dae Jong Kim, Yongin-si (KR); Jong Gyun Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 391 days.

(21) Appl. No.: 17/846,559

(22) Filed: Jun. 22, 2022

(65) Prior Publication Data

US 2023/0216074 A1 Jul. 6, 2023

(30) Foreign Application Priority Data

Jan. 4, 2022 (KR) ........................ 10-2022-0001131

(51) Int. Cl.
*H01M 8/04664* (2016.01)
*H01M 8/04537* (2016.01)

(52) U.S. Cl.
CPC ... *H01M 8/04679* (2013.01); *H01M 8/04559* (2013.01); *H01M 8/04589* (2013.01); *H01M 2250/20* (2013.01)

(58) Field of Classification Search
CPC ......... H01M 8/04679; H01M 8/04559; H01M 8/04589
See application file for complete search history.

(56) References Cited

U.S. PATENT DOCUMENTS

| 10,020,525 | B2 * | 7/2018 | Pi ..................... H01M 8/04679 |
| 10,115,988 | B2 | 10/2018 | Blanchet et al. |
| 11,888,194 | B2 * | 1/2024 | Montoya ........... H01M 8/04305 |

(Continued)

FOREIGN PATENT DOCUMENTS

| CN | 114024003 A | * 2/2022 |
| CN | 114420983 A | * 4/2022 |

(Continued)

OTHER PUBLICATIONS

Machine translation of KR 10-1362740 (no date) (Year: 0000).*

*Primary Examiner* — Amanda C. Walke
(74) *Attorney, Agent, or Firm* — MORGAN, LEWIS & BOCKIUS LLP (57) ABSTRACT

A system for determining performance of a fuel cell stack may include a vehicle that collects a current of the fuel cell stack and a current of the fuel cell stack and a server that receives the voltage of the fuel cell stack and the current of the fuel cell stack from the vehicle in real time, determines an average state of health (SOH) of the fuel cell stack for each current section within an effective current range based on the current of the fuel cell stack and the voltage of the fuel cell stack within the effective current range, determines an overall average SOH in the effective current range based on the average SOH of the fuel cell stack for each current section, and determines whether the fuel cell stack has failed based on the overall average SOH.

20 Claims, 7 Drawing Sheets

(56) References Cited

U.S. PATENT DOCUMENTS

| | | | |
|---|---|---|---|
| 2014/0363751 A1 | 12/2014 | Blanchet et al. | |
| 2015/0153418 A1 | 6/2015 | Prenninger et al. | |
| 2018/0145351 A1 | 5/2018 | Wang et al. | |
| 2018/0287174 A1* | 10/2018 | Won | B60L 58/30 |
| 2019/0036137 A1 | 1/2019 | Blanchet et al. | |
| 2019/0214664 A1 | 7/2019 | Sinha et al. | |
| 2020/0303752 A1* | 9/2020 | Kim | H01M 8/0488 |
| 2021/0175528 A1* | 6/2021 | Pofahl | H01M 8/04679 |
| 2021/0202975 A1 | 7/2021 | Kim et al. | |
| 2021/0376345 A1* | 12/2021 | Namba | H01M 16/006 |

FOREIGN PATENT DOCUMENTS

| | | | | |
|---|---|---|---|---|
| CN | 114475365 A | * | 5/2022 | |
| CN | 114976130 A | * | 8/2022 | H01M 8/04298 |
| EP | 3503274 B1 | * | 5/2020 | B60L 3/0053 |
| JP | 2002-151125 A | | 5/2002 | |
| KR | 10-2011-0027037 A | | 3/2011 | |
| KR | 101362740 B1 | * | 2/2014 | |
| KR | 10-2016-0016967 A | | 2/2016 | |
| KR | 20190053352 A | * | 5/2019 | |

* cited by examiner

| CLASSIFICATION | | FIRST CYCLE | SECOND CYCLE | THIRD CYCLE | ... |
|---|---|---|---|---|---|
| FIRST CURRENT SECTION | FIRST AVERAGE SOH | 95 | 95 | 95 | ... |
| | AVERAGE SOH WEIGHT 1 | 0.35 | 0.35 | 0 | ... |
| SECOND CURRENT SECTION | SECOND AVERAGE SOH | 94 | 94 | 94 | ... |
| | AVERAGE SOH WEIGHT 2 | 0.35 | 0.35 | 0 | ... |
| THIRD CURRENT SECTION | THIRD AVERAGE SOH | 95 | 95 | 95 | ... |
| | AVERAGE SOH WEIGHT 3 | 0.15 | 0.3 | 0 | ... |
| FOURTH CURRENT SECTION | FOURTH AVERAGE SOH | 94 | 94 | 94 | ... |
| | AVERAGE SOH WEIGHT 4 | 0.15 | 0 | 0 | ... |
| OVERALL | OVERALL AVERAGE SOH (STATE) | 94.5 (VALID) | 94.65 (VALID) | - (INVALID) | ... |

SYSTEM AND METHOD FOR DETERMINING PERFORMANCE OF FUEL CELL STACK

CROSS-REFERENCE TO RELATED APPLICATION

The present application claims priority to Korean Patent Application No. 10-2022-0001131, filed on Jan. 4, 2022, the entire contents of which is incorporated herein for all purposes by this reference.

BACKGROUND OF THE PRESENT DISCLOSURE

Field of the Present Disclosure

The present disclosure relates to a system and method for determining the performance of a fuel cell stack.

Description of Related Art

Temporary degradation in performance in a fuel cell stack used in a vehicle affects the behavior of the vehicle and a driver detects a driving abnormality when the temporary degradation occurs in the fuel cell stack. Therefore, it is necessary to determine the performance of the fuel cell stack and accurately diagnose a failure before the driver detects a driving abnormality.

In general, the fuel cell stack performance is determined based on a current-voltage performance graph of the fuel cell stack. Even at the same current of the fuel cell stack, a change in voltage occurs depending on a user's tendency (acceleration/deceleration pattern) or a temperature, and therefore, the performance of the fuel cell stack cannot be quantified, making it difficult to accurately diagnose a failure.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for determining performance of a fuel cell stack by receiving current and voltage information of a fuel cell stack of a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present, a system for determining performance of a fuel cell stack may include a vehicle that collects a voltage of the fuel cell stack and a current of the fuel cell stack and a server that receives the voltage of the fuel cell stack and the current of the fuel cell stack from the vehicle in real time, determines an average state of health (SOH) of the fuel cell stack for each current section within an effective current range based on the current of the fuel cell stack and the voltage of the fuel cell stack within the effective current range, determines an overall average SOH in the effective current range based on the average SOH of the fuel cell stack for each current section, and determines whether the fuel cell stack has failed based on the overall average SOH.

The server may determine an instantaneous SOH based on a first state reference voltage corresponding to the current of the fuel cell stack within the effective current range, a second state reference voltage, and the voltage of the fuel cell stack.

The first state reference voltage may include a reference voltage in a state in which the SOH of the fuel cell stack is 100%, and the second state reference voltage may include a reference voltage in a state in which the SOH of the fuel cell stack is 0%.

The server may accumulate the instantaneous SOH for each current section, and screen the accumulated instantaneous SOHs to extract a valid instantaneous SOH.

The server may determine the average SOH of the fuel cell stack for each current section based on the valid instantaneous SOHs when a number of the valid instantaneous SOHs exceeds a cumulative reference value.

The server may determine the overall average SOH of the effective current range by applying a weight for each current section to the average SOH of the fuel cell stack for each current section.

The server may determine whether the overall average SOH is less than a degradation reference value.

The server may count a number of times of degradation determination cumulatively when the overall average SOH is less than the degradation reference value.

The server may determine whether the number of times of degradation determination exceeds a failure determination reference value.

The server may generate a diagnostic trouble code and transmit the diagnostic trouble code to the vehicle when the number of times of degradation determination exceeds the failure determination reference value.

According to an aspect of the present disclosure, a method for determining performance of a fuel cell stack may include receiving a voltage of the fuel cell stack and a current of the fuel cell stack from a vehicle, determining an average state of health (SOH) of the fuel cell stack for each current section within an effective current range based on the current of the fuel cell stack and the voltage of the fuel cell stack within the effective current range, determining an overall average SOH in the effective current range based on the average SOH of the fuel cell stack for each current section, and determining whether the fuel cell stack has failed based on the overall average SOH.

The method may further include determining an instantaneous SOH based on a first state reference voltage corresponding to the current of the fuel cell stack within the effective current range, and a second state reference voltage, and the voltage of the fuel cell stack.

The first state reference voltage may include a reference voltage in a state in which the SOH of the fuel cell stack is 100%, and the second state reference voltage may include a reference voltage in a state in which the SOH of the fuel cell stack is 0%.

The method may further include accumulating the instantaneous SOH for each current section; and filtering the accumulated instantaneous SOHs to extract a valid instantaneous SOH.

The method may further include determining the average SOH of the fuel cell stack for each current section based on the valid instantaneous SOHs when a number of the valid instantaneous SOHs exceeds a cumulative reference value.

The method may further include determining the overall average SOH of the effective current range by applying a weight for each current section to the average SOH of the fuel cell stack for each current section.

The method may further include determining whether the overall average SOH is less than a degradation reference value.

The method may further include counting a number of times of degradation determination cumulatively when the overall average SOH is less than the degradation reference value.

The method may further include determining whether the number of times of degradation determination exceeds a failure determination reference value.

The method may further include generating a diagnostic trouble code and transmitting the diagnostic trouble code to a vehicle when the number of times of degradation determination exceeds the failure determination reference value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
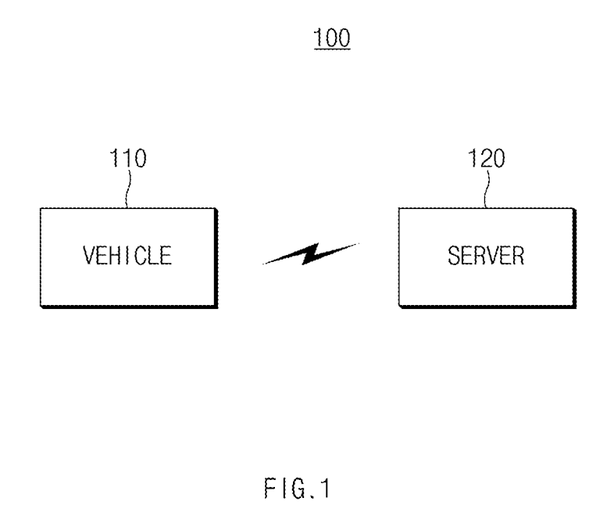
FIG. 1 is a diagram showing a configuration of a system for determining the performance of a fuel cell stack according to an exemplary embodiment of the present disclosure.

FIG. 1 is a diagram showing a configuration of a system for determining the performance of a fuel cell stack according to an exemplary embodiment of the present disclosure.

Referring to FIG. 1, a system 100 for determining the performance of a fuel cell stack according to an exemplary embodiment of the present disclosure may include a vehicle 110 and a server 120.

The vehicle 110 may use power output from a fuel cell stack as a power source for driving a motor. The fuel of the fuel cell stack of the vehicle 110 may be consumed by the overall operation of the vehicle, such as driving a motor, and the vehicle 110 may collect voltage and current of the fuel cell stack that change according to fuel consumption. Furthermore, the vehicle 110 may transmit collected information to the server 120.

The server 120 may determine whether the fuel cell stack has failed based on the current of the fuel cell stack within an effective current range among currents of the fuel cell stack received from the vehicle 110 in real time and voltage of the fuel cell stack corresponding thereto and transmit the determination to the vehicle 110.

Figure 2:
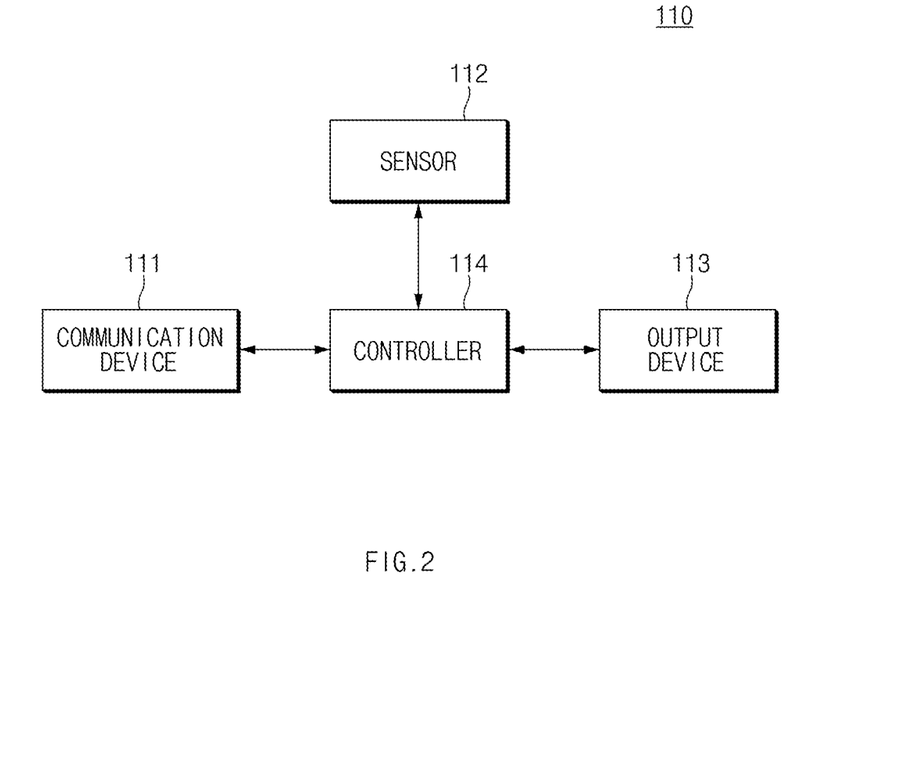
FIG. 2 is a diagram showing a configuration of a vehicle according to an exemplary embodiment of the present disclosure.

FIG. 2 is a diagram showing a configuration of a vehicle according to an exemplary embodiment of the present disclosure.

Referring to FIG. 2, the vehicle 110 may include a communication device 111, a detector 112, an output device 113, and a controller 114.

The communication device 111 may transmit information collected by the detector 112 to the server 120 by performing wireless communication with the server 120. For example, the communication device 111 may communicate with the server 120 through various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

The detector 112 may include a current detector that detects a current output from the fuel cell stack and a voltage detector that detects a voltage output from the fuel cell stack, and may include a temperature detector that detects a temperature of the fuel cell stack.

The output device 113 may output information received from the server 120 in one or more of a visual method and an auditory method. The output device 113 may be implemented as a display device, a sound output device, or the like. Here, the display device may include a display of a navigation device, a HUD, a cluster, and the like.

The controller 114 may be implemented by various processing devices such as a microprocessor incorporating a semiconductor chip configured for operating or executing various instructions or the like and may control an operation of the vehicle according to an exemplary embodiment of the present disclosure.

The controller 114 may perform control to collect an output voltage and output current of the fuel cell stack in real time and transmit the output voltage and output current to the server 120, and output information received from the server 120 to allow a user to intuitively identify a status (performance) of the fuel cell stack.

Figure 3:
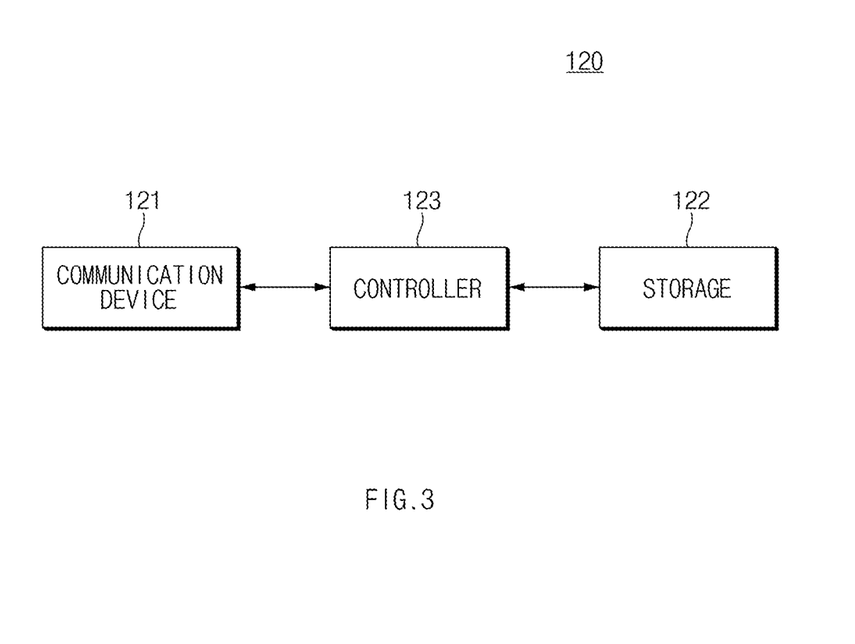
FIG. 3 is a diagram illustrating a configuration of a server according to an exemplary embodiment of the present disclosure.

FIG. 3 is a diagram showing a configuration of the server 120 according to an exemplary embodiment of the present disclosure.

Referring to FIG. 3, the server 120 may include a communication device 121, storage 122, and a controller 123.

The communication device 121 may perform wireless communication with the vehicle 110 and transmit a result determined by the server 120 to the vehicle 110. The communication unit 311 may perform wireless communication with the vehicle 110 through various wireless communication methods including, for example, Wi-Fi, WiBro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

The storage 122 may store at least one algorithm for performing operations or execution of various commands for the operation of the server 120 according to an exemplary embodiment of the present disclosure. The storage 122 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, and an optical disk.

The controller 114 may be implemented by various processing devices such as a microprocessor incorporating a semiconductor chip configured for operating or executing various instructions or the like and may control an operation of the server according to an exemplary embodiment of the present disclosure.

The controller 123 may determine whether warm-up of the fuel cell stack of the vehicle 110 is completed. Because the fuel cell stack is operated normally at a predetermined temperature due to characteristics thereof, the controller 123 may determine whether the fuel cell stack is in a state in which the fuel cell stack can be operated normally after being warmed up. When it is determined that the warm-up of the fuel cell stack is not completed, the controller 123 may determine that the fuel cell stack is not in a normal operating state and determine that the state of health (SOH) of the fuel cell is zero.

When it is determined that the warm-up of the fuel cell stack is completed, the controller 123 may determine that the fuel cell stack is in a normal operating state and receive the voltage of the fuel cell stack and the current of the fuel cell stack in real time from the vehicle 110.

The controller 123 may determine whether the current of the fuel cell stack received in real time exceeds a reference current. Here, the reference current may be the lowest reference for determining an effective current range, and may have a fixed value. The controller 123 may determine that the current of the fuel cell stack is out of the effective current range in a section (low current section) in which the current of the fuel cell stack does not exceed the reference current, and exclude the current values of the fuel cell stack in the low current section without using the current values to determine the performance of the fuel cell stack.

Therefore, the controller 123 may determine an instantaneous SOH when the current of the fuel cell stack received in real time exceeds the reference current, and determine that the health state of the fuel cell is zero when the current of the fuel cell stack received in real time does not exceed the reference current.

The controller 123 may classify the effective current range into "n" current sections, and when the current value of the fuel cell stack received in real time is provided in a classified current section, determine the instantaneous SOH of the fuel cell stack based on the current value of the fuel cell stack. A more detailed description will be provided with reference to FIG. 4.

Figure 4:
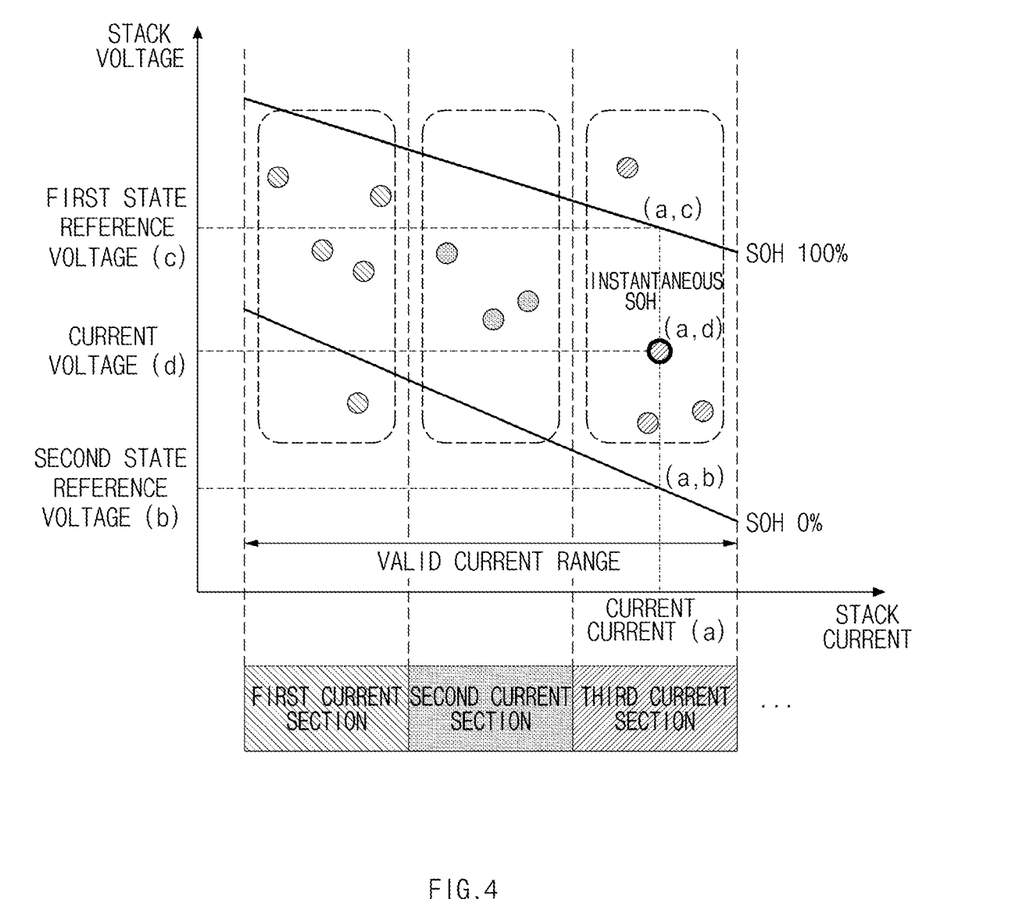
FIG. 4 is a diagram schematically illustrating a method of determining an instantaneous SOH according to an exemplary embodiment of the present disclosure.

FIG. 4 is a diagram schematically illustrating a method of determining an instantaneous SOH according to an exemplary embodiment of the present disclosure.

Referring to FIG. 4, the controller 123 may classify an effective current range into a first current section, a second current section, and a third current section. According to the exemplary embodiment of the present disclosure, when a current of the fuel cell stack is referred to as "a" and a voltage of the fuel cell stack is referred to as "d", the controller 123 may determine a first state reference voltage corresponding to the current "a" of the fuel cell stack as "c" and a second state reference voltage as "b", and determine the instantaneous SOH based on the first state reference voltage "c", the second state reference voltage "b", and the voltage "d" of the fuel cell stack. Here, the first state reference voltage may refer to a reference voltage in a state in which the SOH of the fuel cell stack is 100%, and the second state reference voltage may refer to a reference voltage in a state in which the SOH of the fuel cell stack is zero.

As an exemplary embodiment of the present disclosure, the controller 123 may determine the instantaneous SOH by use of Equation 1 for proportionally distributing the voltage value "d" of the fuel cell stack based on the first state reference voltage value "c" and the second state reference voltage value "b".

$$\text{Instantaneous SOH} = \{(d-b)/(c-b)\}*100 \qquad \text{<Equation 1>}$$

Although a method of determining the instantaneous SOH based on a current value of the fuel cell stack included in the third current section has been described with reference to FIG. 4, the above-described method may be equally applied to all current sections classified within the effective current range.

The controller 123 may determine in which current section a current value of the fuel cell stack is included.

According to an exemplary embodiment of the present disclosure, when it is determined that the current value of the fuel cell stack is included in the first current section, the controller 123 may accumulate instantaneous SOHs of the first current section.

Furthermore, the controller 123 may extract a valid instantaneous SOH by filtering the accumulated instantaneous SOHs in the first current section. For example, the controller 123 may perform filtering and extract, as a valid instantaneous SOH, only an instantaneous SOHs determined when the operation condition of the fuel cell stack, which may affect the performance of the fuel cell stack, is in a normal state.

The controller 123 may determine whether the number of valid instantaneous SOHs filtered in the first current section exceeds a cumulative reference value. That is, when the number of filtered valid instantaneous SOHs exceeds the cumulative reference value, the controller 123 may determine that data for determining an average SOH of the first current section is secured. Here, the cumulative reference value may have a fixed value.

Accordingly, when it is determined that the number of valid instantaneous SOHs filtered in the first current section exceeds the cumulative reference value, the controller 123 may determine a first average SOH which is an average of the valid instantaneous SOHs in the first current section.

The controller 123 may apply a weight of the first current section preset for each current section to the first average SOH. Here, the weight of each current section preset for each current section may be set according to the importance of each current section, and may be determined according to the driving frequency of the vehicle and output efficiency according to the current.

For example, a weight of a low current section having high output efficiency may be set to be higher than a weight of a high current section, and the weight may have a fixed value.

When the operation of applying the weight (weight 1) of the first current section to the first average SOH is completed, the controller 123 may accumulate instantaneous SOHs of the second current section.

Furthermore, the controller 123 may filter the instantaneous SOH included in the second current section to extract the valid instantaneous SOH, and determine whether the number of valid instantaneous SOHs filtered in the second current section exceeds the cumulative reference value.

When it is determined that the number of valid instantaneous SOHs filtered in the second current section exceeds the cumulative reference value, the controller 123 may determine a second average SOH which is an average of the valid instantaneous SOHs in the second current section.

The controller 123 may apply a weight (weight 2) of the second current section preset for each current section to the second average SOH.

The controller 123 may determine average SOHs of all current sections by applying the same method as described above to the current sections classified within the effective current range, and apply a weight of each current section to an average SOH of each current section.

The controller 123 may determine an overall average SOH of the entire effective current range based on values obtained by respectively applying the weights of the current sections to the average SOHs of the current sections. According to an exemplary embodiment of the present disclosure, the controller 123 may determine the overall average SOH by use of Equation 2.

$$\text{Overall average } SOH = \frac{\Sigma_{(k=1)}^{n}(k^{th} \text{ current section average } SOH * k^{th} \text{current section weight})}{\Sigma_{(k=1)}^{n}(k^{th} \text{current section weight})} \quad <\text{Equation 2}>$$

Figure 5:
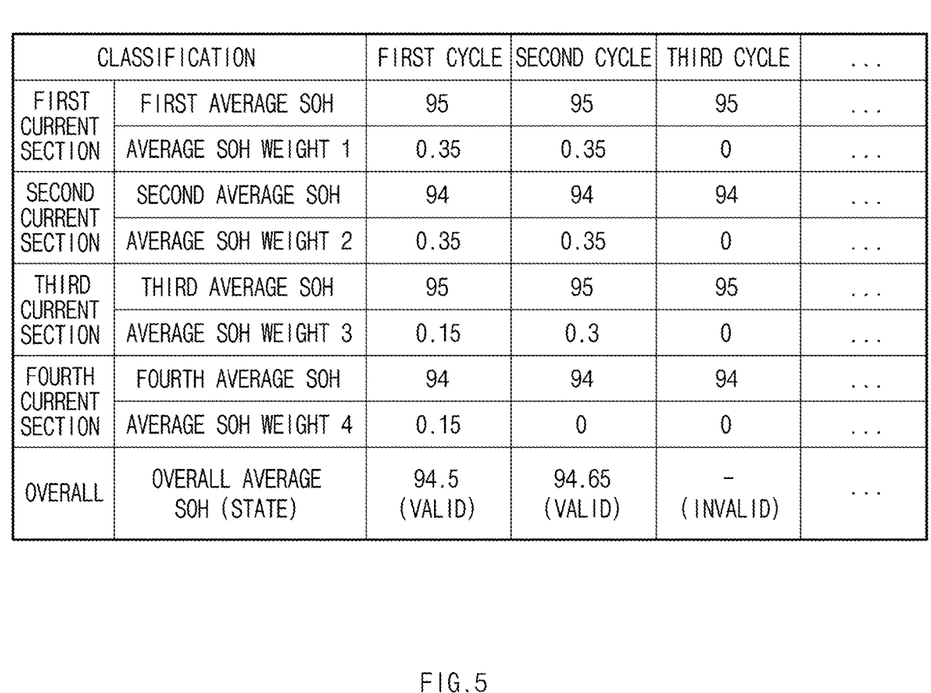
FIG. 5 is a table showing parameters required to determine an overall average SOH according to an exemplary embodiment of the present disclosure.

A more detailed description will be provided with reference to FIG. 5.

FIG. 5 is a table showing parameters required to determine an overall average SOH according to an exemplary embodiment of the present disclosure.

Referring to FIG. 5, the controller 123 may determine the average SOH of each current section, and set a state value of the average SOH according to the validity of the average SOH of each current section. Furthermore, the controller 123 may determine whether to apply a preset weight to the average SOH for each current section according to the state value of the average SOH.

For example, when the average SOH determined in the fourth current section is invalid during a second cycle, the controller 123 may prevent the preset weight from being applied to the average SOH so that the average SOH determined in the fourth current section is excluded when determining the overall average SOH.

When the overall average SOH is determined, the controller 123 may compare the determined overall average SOH with a degradation determination reference value. The degradation determination reference value may mean a reference value used to determine whether the performance of the fuel cell stack is degraded, and may have a fixed value.

The controller 123 may count the number of times of degradation determination cumulatively when it is determined that the overall average SOH of the current sections is less than the degradation determination reference value, and determine that there is no failure when it is determined that the overall average SOH is not less than the degradation determination reference value.

When fuel is re-injected into the vehicle 110 after the fuel in the fuel cell stack has been consumed, the controller 123 may repeatedly perform a series of operations from the operation of determining fuel warm-up to the operation of determining the overall average SOH. Furthermore, the controller 123 may compare the overall average SOH determined in each cycle with the degradation determination reference value, and when the overall average SOH is less than the degradation determination reference value, count the number of times of degradation determination cumulatively.

The controller 123 may determine whether the accumulated number of degradation determinations exceeds a failure determination reference value. The failure determination reference value may refer to a reference value used to determine failure when degradation determination is repeatedly made and may have a fixed value.

When it is determined that the number of times of deterioration determination exceeds the failure determination reference value, the controller 123 may determine that a failure has occurred in the fuel cell stack. Meanwhile, when the accumulated number of times of deterioration determination does not exceed the failure determination reference value, the controller 123 may determine that there is no failure.

When it is determined that a failure has occurred in the fuel cell stack, the controller 123 may generate a diagnostic trouble code and perform control to transmit the diagnostic trouble code to a vehicle.

Figure 6:
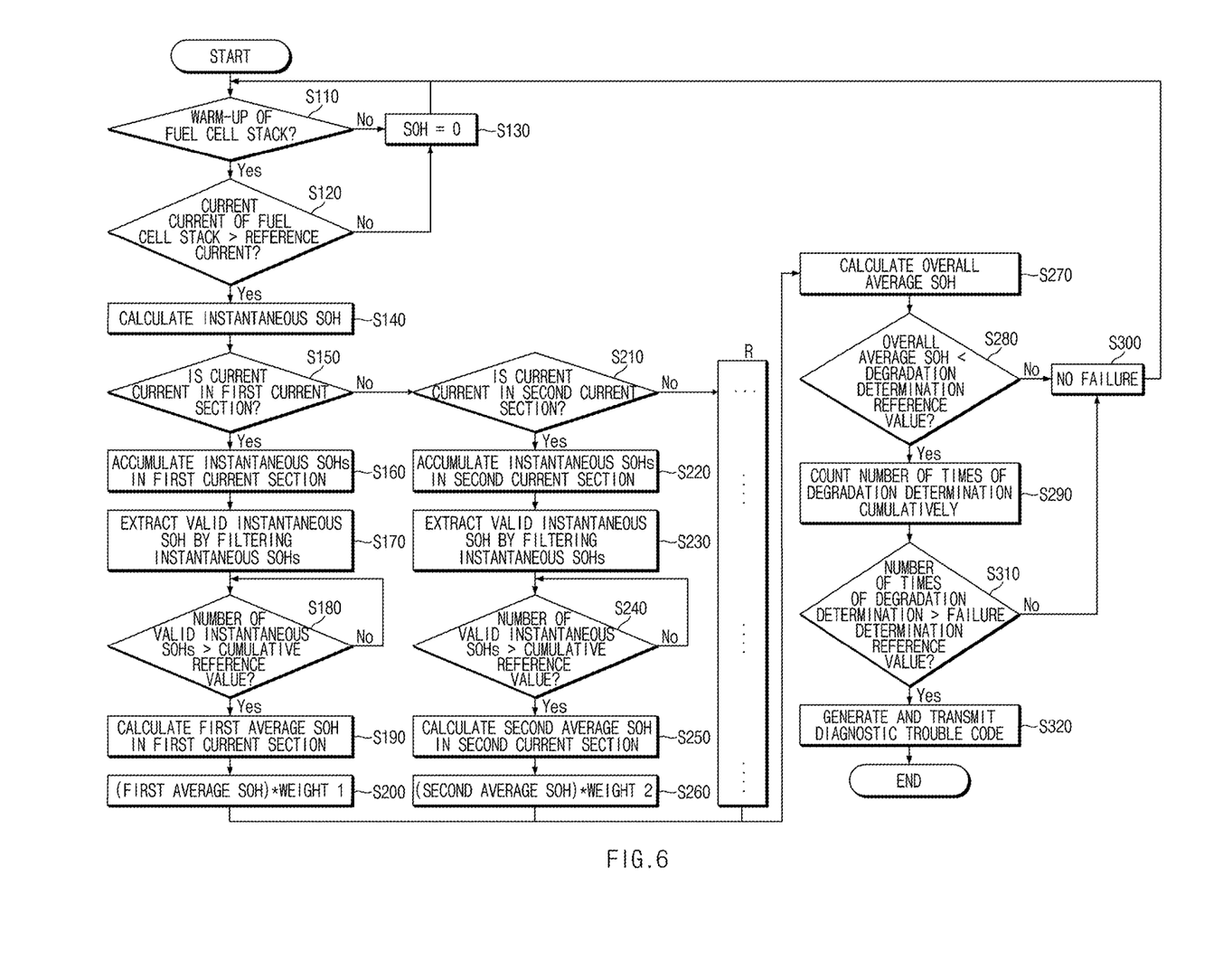
FIG. 6 is a flowchart illustrating a method for determining performance of a fuel cell stack according to an exemplary embodiment of the present disclosure.

FIG. 6 is a flowchart illustrating a method for determining performance of a fuel cell stack according to an exemplary embodiment of the present disclosure.

The server 120 may determine whether warming up of the fuel cell stack of the vehicle 110 is completed (S110). In S110, because the fuel cell stack is operated normally at a predetermined temperature due to characteristics thereof, the server 120 may determine whether the fuel cell stack is in a state in which the fuel cell stack can be operated normally after being warmed up.

In S110, when it is determined that the warm-up of the fuel cell stack is not completed (No), the server 120 may determine that the fuel cell stack is not in a normal operating state and determine that the state of health (SOH) of the fuel cell is zero (S130).

In S110, when it is determined that the warm-up of the fuel cell stack is completed (Yes), the server 120 may determine that the fuel cell stack is in a normal operating state and receive the voltage of the fuel cell stack and the current of the fuel cell stack in real time from the vehicle 110.

The server 120 may determine whether the current of the fuel cell stack received in real time is greater than a reference current (S120). In S120, the reference current may be the lowest reference for determining an effective current range, and may have a fixed value. The server 120 may determine that the current of the fuel cell stack is out of the effective current range in a section (low current section) in which the current of the fuel cell stack does not exceed the reference current, and exclude the current values of the fuel cell stack in the low current section without using the current values to determine the performance of the fuel cell stack.

Accordingly, in S120, the server 120 may determine an instantaneous SOH (S140) when the current of the fuel cell stack received in real time exceeds the reference current (Yes), and determine that the health state of the fuel cell is zero (S130) when the current of the fuel cell stack received in real time does not exceed the reference current (No).

In S140, the server 120 may classify the effective current range into "n" current sections, and when the current value of the fuel cell stack received in real time is included in a classified current section, determine the instantaneous SOH of the fuel cell stack based on the current value of the fuel cell stack. Regarding the details thereof, the above description of FIG. 4 may be referred to.

According to the exemplary embodiment in S140, the server 120 may classify an effective current range into a first current section, a second current section, and a third current section. Furthermore, when a current of the fuel cell stack is referred to as "a" and a voltage of the fuel cell stack is referred to as "d", the server 120 may determine a first state reference voltage corresponding to the current "a" of the fuel cell stack as "c" and a second state reference voltage as "b", and determine the instantaneous SOH based on the first state reference voltage "c", the second state reference voltage "b", and the voltage "a" of the fuel cell stack. Here, the first state reference voltage may refer to a reference voltage in a state in which the SOH of the fuel cell stack is 100%, and the second state reference voltage may refer to a reference voltage in a state in which the SOH of the fuel cell stack is 0%. As an exemplary embodiment of the present disclosure, the server 120 may determine the instantaneous SOH using <Equation 1>.

In S140, the instantaneous SOH determination method may be equally applied to each of current sections classified within the effective current range.

The server 120 may determine whether a current value of the fuel cell stack is included in a first current section (S150).

In S150, when it is determined that the current value of the fuel cell stack is included in the first current section (Yes), the server 120 may accumulate instantaneous SOHs of the first current section (S160). Meanwhile, when the current value of the fuel cell stack is not included in the first current section in S150, the server 120 may determine whether the current value of the fuel cell stack is included in a second current section (S210).

The server 120 may extract a valid instantaneous SOH by filtering the accumulated instantaneous SOHs in the first current section (S170). For example, in S170, the server 120 may perform filtering and extract, as a valid instantaneous SOH, only an instantaneous SOH determined when the operation condition of the fuel cell stack, which may affect the performance of the fuel cell stack, is in a normal state.

The server 120 may determine whether the number of valid instantaneous SOHs filtered in the first current section exceeds a cumulative reference value (S180). In S180, when the number of filtered valid instantaneous SOHs exceeds the cumulative reference value (Yes), the server 120 may determine that data for determining an average SOH of the first current section is secured. Accordingly, the cumulative reference value may have a fixed value.

In S180, when it is determined that the number of valid instantaneous SOHs filtered in the first current section exceeds the cumulative reference value (Yes), the server 120 may determine a first average SOH which is an average of the valid instantaneous SOHs in the first current section (S190). In S180, when the number of valid instantaneous SOHs filtered in the first current section does not exceed the cumulative reference value (No), the server 120 may perform re-determination until the number of valid instantaneous SOHs exceeds the cumulative reference value.

The server 120 may apply a weight of the first current section preset for each current section to the first average SOH (S200).

The server 120 may determine whether the current value of the fuel cell stack is included in the second current section (S210) when the current value of the fuel cell stack is not included in the first current section and accumulate the instantaneous SOHs of the second current section when the current value of the fuel cell stack is included in the second current section (S220).

Furthermore, the server 120 may filter the instantaneous SOHs accumulated in the second current section to extract a valid instantaneous SOH (S230), and determine whether the number of valid instantaneous SOHs filtered in the second current section exceeds the cumulative reference value (S240).

In S240, when it is determined that the number of valid instantaneous SOHs filtered in the second current section exceeds the cumulative reference value (Yes), the server 120 may determine a second average SOH which is an average of the valid instantaneous SOHs in the second current section (S250).

The server 120 may apply a weight of the second current section preset for each current section to the second average SOH (S260).

Thereafter, the server 120 may repeatedly perform operations S150 to S200 (R). As a result, the server 120 may determine an average SOH of the current sections classified within the effective current range. Meanwhile, when the current is not included in the current sections classified within the effective current range, the server 120 may repeatedly perform determination whether the current is included in the current sections classified within the effective current range.

The server 120 may determine an overall average SOH of the entire effective current range based on values obtained by respectively applying the weights of the current sections to the average SOHs of the current sections (S270). According to an exemplary embodiment of the present disclosure, in S270, the server 120 may determine the overall average SOH by use of Equation 2.

When the server 120 determines the overall average SOH, the server 120 may compare the determined overall average SOH with a degradation determination reference value (S280). The degradation determination reference value may mean a reference value used to determine whether the performance of the fuel cell stack is degraded, and may have a fixed value.

The server 120 may count the number of times of degradation determination cumulatively when it is determined that the overall average SOH of the current sections is less than the degradation determination reference value (S290), and determine that there is no failure when it is determined that the overall average SOH is not less than the degradation determination reference value (S300).

When fuel is re-injected into the vehicle 110 after the fuel in the fuel cell stack has been consumed, the server 120 may repeatedly perform operations from operation S110 of determining fuel warm-up to operation S270 of determining the overall average SOH.

The server 120 may compare the overall average SOH determined in each cycle with the degradation determination reference value in S280, and when the overall average SOH is less than the degradation determination reference value (Yes), count the number of times of degradation determination cumulatively (S290).

The server 120 may determine whether the accumulated number of degradation determinations exceeds a failure determination reference value (S310). The failure determination reference value may refer to a reference value used to determine failure when degradation determination is repeatedly made and may have a fixed value.

In S310, when it is determined that the number of times of deterioration determination exceeds the failure determination reference value (Yes), the server 120 may determine that a failure has occurred in the fuel cell stack. When it is determined that a failure has occurred in the fuel cell stack, the server 120 may generate a diagnostic trouble code and perform control to transmit the diagnostic trouble code to a vehicle (S320).

Meanwhile, when the accumulated number of times of deterioration determination does not exceed the failure determination reference value in S310, the server 120 may determine that there is no failure (S300).

Figure 7:
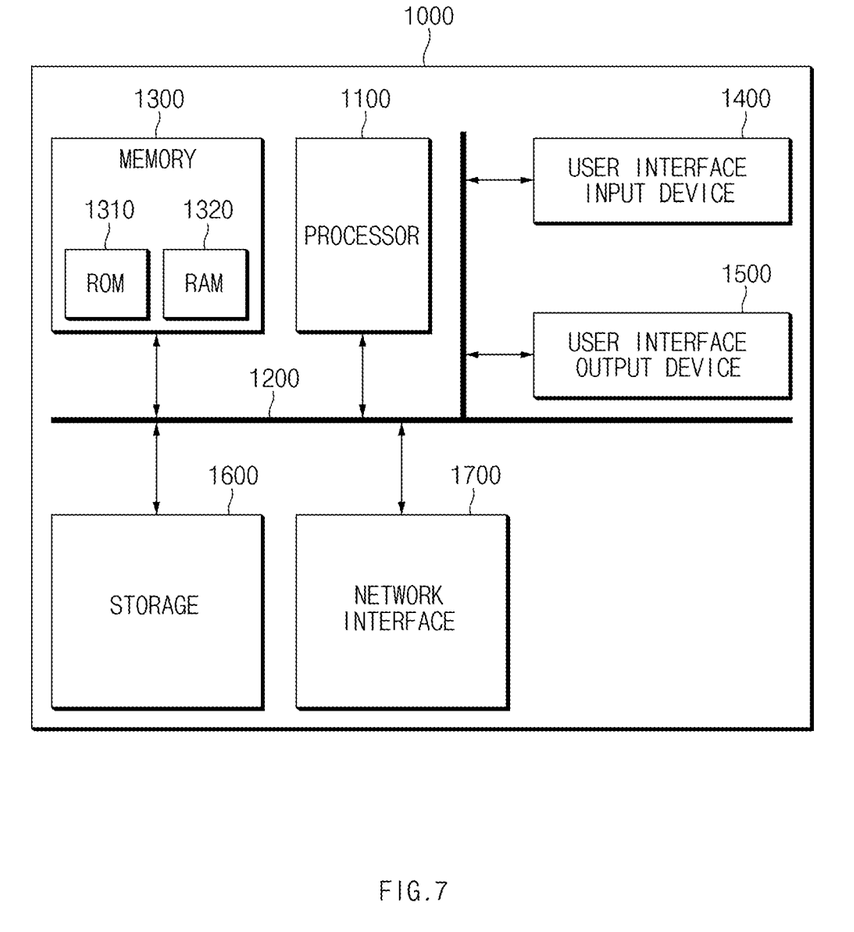
FIG. 7 a diagram showing a configuration of a determining system for executing a method according to an exemplary embodiment of the present disclosure.

FIG. 7 a diagram showing a configuration of a determining system for executing a method according to an exemplary embodiment of the present disclosure.

Referring to FIG. 7, a determining system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The system and method for determining the performance of a fuel cell stack according to an exemplary embodiment of the present disclosure receive current and voltage information of a fuel cell stack of a vehicle, analyze degradation of the fuel cell stack, and accurately determine whether to replace the fuel cell stack, thus improving driving stability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for determining performance of a fuel cell stack, the system comprising:
a vehicle configured to collect a voltage of the fuel cell stack and a current of the fuel cell stack; and
a server configured to receive the voltage of the fuel cell stack and the current of the fuel cell stack from the vehicle in real time, determine an average state of health (SOH) of the fuel cell stack for each current section within an effective current range based on the current of the fuel cell stack and the voltage of the fuel cell stack within the effective current range, determine an overall average SOH in the effective current range based on the average SOH of the fuel cell stack for each current section, and determine whether the fuel cell stack has failed based on the overall average SOH,
wherein, when the current of the fuel cell stack received from the vehicle in real time is provided in the current section in effective current range, the server determines instantaneous SOH of the fuel cell based on the current value of the fuel cell stack.

2. The system of claim 1, wherein the server is configured to determine the instantaneous SOH based on a first state reference voltage corresponding to the current of the fuel cell stack within the effective current range, a second state reference voltage, and the voltage of the fuel cell stack.

3. The system of claim 2, wherein the first state reference voltage refers to a reference voltage in a state in which the SOH of the fuel cell stack is 100%, and the second state reference voltage refers to a reference voltage in a state in which the SOH of the fuel cell stack is 0%.

4. The system of claim 2, wherein the server is configured to accumulate the instantaneous SOH for each current section, and filter the accumulated instantaneous SOHs to extract a valid instantaneous SOH.

5. The system of claim 4, wherein the server is configured to determine the average SOH of the fuel cell stack for each current section based on the valid instantaneous SOHs when a number of the valid instantaneous SOHs exceeds a cumulative reference value.

6. The system of claim 5, wherein the server is configured to determine the overall average SOH of the effective current range by applying a weight for each current section to the average SOH of the fuel cell stack for each current section.

7. The system of claim 1, wherein the server is configured to determine whether the overall average SOH is less than a degradation reference value.

8. The system of claim 7, wherein the server is configured to count a number of times of degradation determination cumulatively when the overall average SOH is less than the degradation reference value.

9. The system of claim 8, wherein the server is configured to determine whether the number of times of degradation determination exceeds a failure determination reference value.

10. The system of claim 9, wherein the server is configured to generate a diagnostic trouble code and transmit the diagnostic trouble code to the vehicle when the number of times of degradation determination exceeds the failure determination reference value.

11. A method for determining performance of a fuel cell stack, the method comprising:
receiving, by a server, a voltage of the fuel cell stack and a current of the fuel cell stack from a vehicle;
determining, by the server, an average state of health (SOH) of the fuel cell stack for each current section within an effective current range based on the current of the fuel cell stack and the voltage of the fuel cell stack within the effective current range;
determining, by the server, an overall average SOH in the effective current range based on the average SOH of the fuel cell stack for each current section;
determining, by the server, whether the fuel cell stack has failed based on the overall average SOH; and
determining, by the server, instantaneous SOH of the fuel cell based on the current value of the fuel cell stack, when the current of the fuel cell stack received from the vehicle in real time is provided in the current section in effective current range.

12. The method of claim 11, further including:
determining, by the server, the instantaneous SOH based on a first state reference voltage corresponding to the current of the fuel cell stack within the effective current range, a second state reference voltage, and the voltage of the fuel cell stack.

13. The method of claim 12, wherein the first state reference voltage refers to a reference voltage in a state in which the SOH of the fuel cell stack is 100%, and the second state reference voltage refers to a reference voltage in a state in which the SOH of the fuel cell stack is 0%.

14. The method of claim 12, further including:
accumulating, by the server, the instantaneous SOH for each current section; and
filtering, by the server, the accumulated instantaneous SOHs to extract a valid instantaneous SOH.

15. The method of claim 14, further including:
determining, by the server, the average SOH of the fuel cell stack for each current section based on the valid instantaneous SOHs when a number of the valid instantaneous SOHs exceeds a cumulative reference value.

16. The method of claim 15, further including:
determining, by the server, the overall average SOH of the effective current range by applying a weight for each current section to the average SOH of the fuel cell stack for each current section.

17. The method of claim 11, further including:
determining, by the server, whether the overall average SOH is less than a degradation reference value.

18. The method of claim 17, further including:
counting, by the server, a number of times of degradation determination cumulatively when the overall average SOH is less than the degradation reference value.

19. The method of claim 18, further including:
determining, by the server, whether the number of times of degradation determination exceeds a failure determination reference value.

20. The method of claim 19, further including:
generating, by the server, a diagnostic trouble code and transmitting, by the server, the diagnostic trouble code to the vehicle when the number of times of degradation determination exceeds the failure determination reference value.

* * * * *